: 3,182,568
PISTON FOR EXPANDING ARBOR
Arthur George Davis, 854 Grand Marais,
Grosse Pointe Park, Mich.
Filed Nov. 18, 1963, Ser. No. 324,347
5 Claims. (Cl. 92—194)

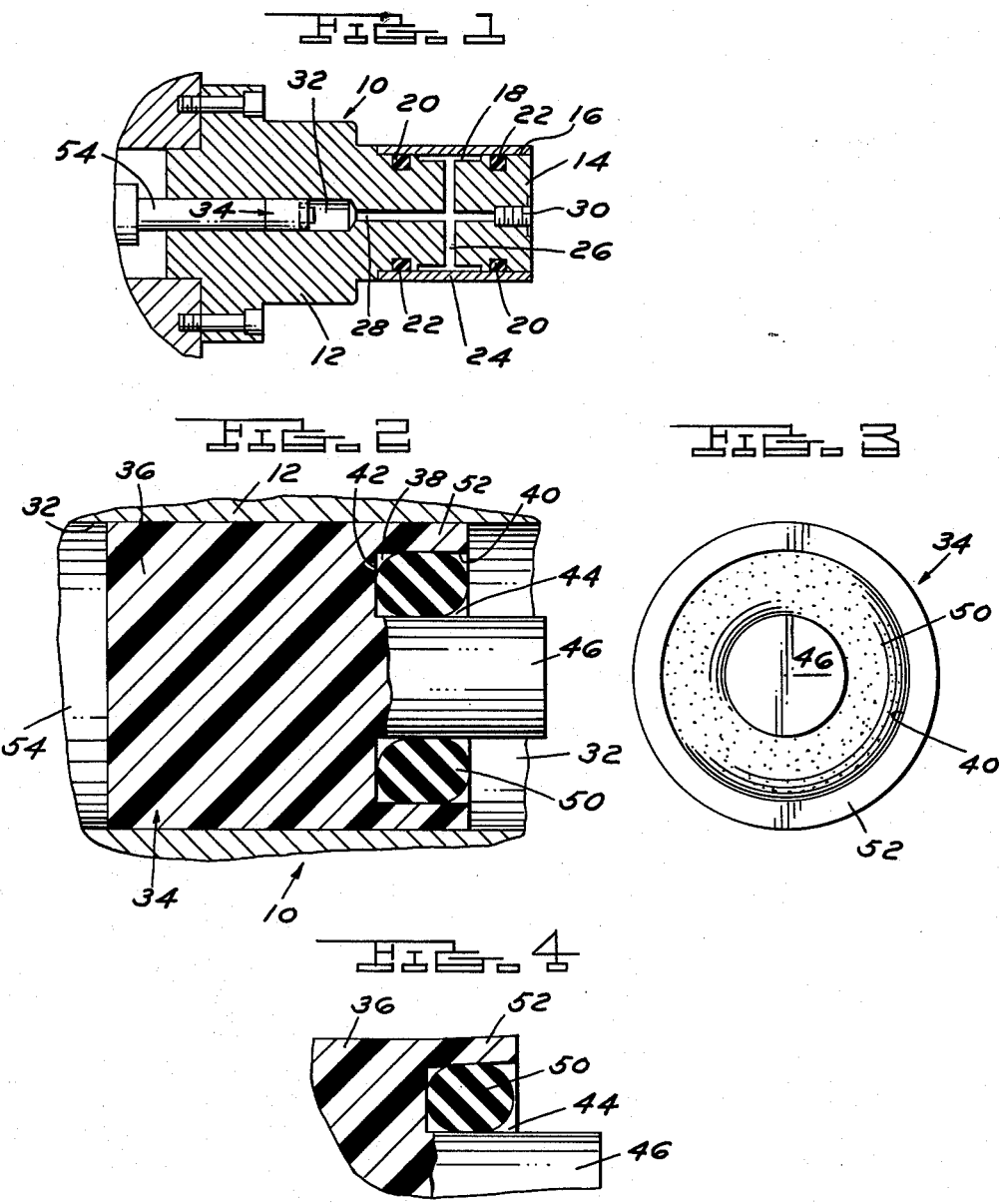
INVENTOR.
ARTHUR GEORGE DAVIS
ATTORNEYS

This invention relates generally to pistons, and refers more particularly to a piston for use in a hydraulically actuated chuck or arbor.

One of the essential objects of the invention is to provide a piston which makes a better seal with the cylinder wall, particularly upon initial actuation thereof.

Another object is to provide a piston having a wall portion which is normally under a slight radially outward tension to be expanded against the cylinder wall.

Another object is to provide a piston having a relatively thin wall, and means imposing a radially outward pressure on the wall to expand it into firm engagement with the cylinder. Hence when the piston is initially actuated and pressure begins to build up in the hydraulic system, the expanded wall of the piston will prevent the leakage of hydraulic fluid past the piston.

Another object is to provide a piston having a circular recess in one end and an integral flexible thin wall or lip surrounding the recess, with means, preferably in the form of an O-ring, in the recess for expanding the lip.

An O-ring is not an anti-friction member and hence will not wear well. In accordance with the present invention however, the O-ring does not contact the cylinder wall. This is a departure from conventional practice in which the O-ring has itself been used as the sealing member in direct contact with the wall of the cylinder. The objection to having the O-ring contact the cylinder wall is that the O-ring will lose its ability to seal fairly rapidly by reason of normal wear and also by reason of the tendency of the O-ring to be extruded out of its groove.

Another object is to provide a piston formed of a flexible, resilient material such as plastic, which may, for example, be nylon or Teflon.

Other objects and features of the invention will become more apparent as the description proceeds, especially when taken in conjunction with the accompanying drawing, wherein:

FIGURE 1 is a longitudinal sectional view of a hydraulically expanding arbor having a piston embodying my new design, all in accordance with the invention.

FIGURE 2 is an enlarged fragmentary sectional view of a portion of FIGURE 1, illustrating the construction of the piston.

FIGURE 3 is an elevational view of the right end of the piston as seen in FIGURE 2.

FIGURE 4 is a fragmentary sectional view of the piston shown outside the cylinder so that the natural flare on the end of the piston can be observed.

Referring now more particularly to the drawing, the arbor is generally indicated at 10 and comprises a body 12 having an elongated work supporting extension 14 at one end. The extension 14 has a substantially cylindrical surface 16 in which an annular recess 18 is formed. On each side of the recess 18 there is an annular groove 20, and there is an O-ring 22 in each groove. The O-rings 22 in their normal free state are of a diameter greater than the depth of the grooves 20, so that they will project above the surface 16 of the extension when under no compression. An expanding sleeve 24 encircles the extension 14 in close surface-to-surface engagement with the surface 16, compressing the O-rings 22 to form fluid seals on both sides of recess 18.

The recess 18 is part of a closed hydraulic system which includes the radial passages 26 and the communicating axial passage 28. One end of the axial passage is closed by a threaded plug 30. The axial passage 28 leads into to axial cylinder in the main body portion 12 of the arbor, which cylinder is of enlarged diameter and is designated 32.

A piston 34 operates in the cylinder 32 to pressurize the hydraulic fluid in the cylinder, passages 26 and 28, and recess 18, and in that manner to expand sleeve 24. The piston 34 has an elongated cylindrical body 36, and the one end of the body is formed with an annular recess 38. The recess 38 is circular and concentric with the axis of the piston. Such recess 38 has an annular longitudinally extending surface 40 which is uniformly spaced from the outer surface of the cylinder throughout its full circular extent. The recess 38 also has a circular radially extending inner surface 42 defining the bottom of the recess. A small radius will preferably connect surface 40 and 42. The radially inner wall 44 of recess 38 is cylindrical and extends axially in concentric relation with the annular surface 40. The inner wall 44 of the recess is actually an extension or continuation of the cylindrical surface of the central integral axial extension 46. Extension 46 facilitates assembly of the O-ring.

A rubber O-ring 50 is disposed within the recess 38. The radial cross-section of the O-ring in its free state is greater than the radial width of the recess 38 measured from surface 40 to wall 44. Hence the O-ring 50 is under radial compression in the recess. Also the I.D. of the O-ring in its free state is less than the diameter of the extension 46 so that the O-ring is expanded over the extension when assembled.

The lip 52 of the piston surrounding the recess is relatively thin. As an example, if the piston were to have a length of approximately ½", the lip thickness might be on the order of approximately 0.20 inch. In any event, the lip will be sufficiently thin that it can flex. In this connection, it will be understood that the piston is made from a suitable material having inherent resilience and flexibility. Suitable materials might be nylon or Teflon for example.

As seen in FIGURE 4 in which the piston is shown outside the cylinder, the O-ring imposes sufficient outward pressure on the piston lip 52 to expand it slightly. Since the wall of the cylinder 32 is of substantially the same diameter as the body of the piston, the piston will have a close sliding fit. The lip 52 will be expanded by the compression of the O-ring into a more firm engagement with the cylinder wall to provide a better seal.

Leakage around the piston is most apt to occur during the initial build-up of hydraulic pressure as the piston starts to advance. Any suitable means, such as the push rod 54, may be provided to advance the piston. The compression of the O-ring 50 provides enough pressure on the lip 52 to expand it against the cylinder wall and make an adequate seal during the critical initial period of pressure build-up in the hydraulic fluid. Thereafter of course the force of the pressurized hydraulic fluid in the cylinder 32 will act on the O-ring 50 and within the recess 38 to increase the seal at the lip.

As pointed out above, the piston has a close sliding fit in the cylinder 32. It is not required, nor is it even desired, that the piston have an interference fit in the cylinder. The necessary sealing action is accomplished by the lip 52 together with the O-ring which operates to expand the lip into sealing engagement with the cylinder wall even before pressure has built up in the hydraulic system. Of course as the pressure build-up in the cylinder 32 continues, the lip 52 is expanded with even greater force against the cylinder wall.

In the past pistons have been made having an interference fit. However, an interference fit produces excessive friction with resultant wear. Naturally as the piston wears, the sealing action decreases. On the other hand, where the sealing action in prior pistons has been effected by an O-ring in a peripheral groove in the piston having direct contact with the cylinder wall, the O-ring itself was subjected to excessive wear and also tended to break down as the result of being extruded out of its groove. O-rings are naturally subject to a high rate of wear when in contact with the cylinder wall because of the friction character of the rubber or like material from which they are made. The O-ring as utilized in the construciton described herein does not contact the cylinder wall and hence is not subject to any wear. The piston in the construction described herein does not have an interference fit and by reason of the material from which it is formed has very good non-friction or glide characteristics when moved back and forth in the cylinder.

What I claim as my invention is:

1. A piston for use in the cylinder of a hydraulic system, said piston having a solid cylindrical body formed from resilient material and provided at one end with an annular recess opening outwardly through said one end, said recess having a generally radially extending circular inner surface and having an annular longitudinally extending surface connected to said inner surface and concentric with the axis of said cylindrical body, said cylindrical body being provided at the center of said annular recess with an integral axial extension concentric with said annular longitudinally extending surface, the resilient material of the portion of said cylindrical body encircling said recess, and including said longitudinally extending surface, constituting a relatively thin and flexible circular lip, and an O-ring formed from plastic material encircling said axial extension and disposed within said recess, the radial cross-section of said O-ring in its free state being greater than the radial width between said axial extension and said annular longitudinally extending surface, whereby said O-ring is under radial compression between said axial extension and said annular longitudinally extending surface and exerts a radially outward pressure on said relatively thin and flexible circular lip to expand said lip for firm contact with the cylinder.

2. The piston defined in claim 1, wherein said cylindrical body is formed from plastic material.

3. The piston defined in claim 1, wherein the O-ring is solid and is made from rubber.

4. The piston defined in claim 1, wherein the inside diameter of said O-ring in its free state is less than the diameter of said axial extension whereby said O-ring, when disposed in said recess and encircling said axial extension as aforesaid, is radially expanded by said axial extension and circumferentially stretched.

5. A piston for use in the cylinder of a hydraulic system, said piston having a solid cylindrical body formed from resilient material and provided at one end with an annular recess opening outwardly through said one end, said recess having a generally radially extending circular inner surface and having an annular radially outer longitudinally extending surface connected to said inner surface and concentric with the axis of said cylindrical body, said recess also having an annular radially inner longitudinally extending surface connected to said inner surface and concentric with the axis of said cylindrical body, the resilient material of the portion of said cylindrical body encircling said recess, and including said radially outer longitudinally extending surface, constituting a relatively thin and flexible circular lip, and an O-ring formed from plastic material concentric with and disposed within said recess, the radial cross-section of said O-ring in its free state being greater than the radial width between said radially inner and outer longitudinally extending surfaces, whereby said O-ring is under radial compression therebetween and exerts a radially outward pressure on said relatively thin and flexible circular lip to expand said lip for firm contact with the cylinder.

References Cited by the Examiner

UNITED STATES PATENTS

| | | | |
|---|---|---|---|
| 2,106,829 | 2/38 | Christenson | 92—249 |
| 2,430,492 | 11/47 | Carlson | 92—194 |
| 2,665,179 | 1/54 | Salvatora | 92—249 |
| 2,814,540 | 11/57 | Southerwick | 92—194 |
| 2,953,223 | 9/60 | Dillenburger | 92—194 X |
| 3,092,427 | 6/63 | Sadler | 92—194 |

RICHARD B. WILKINSON, *Primary Examiner.*

KARL J. ALBRECHT, *Examiner.*